United States Patent Office 3,326,824
Patented June 20, 1967

3,326,824
COMPATIBLE BLENDS OF POLYMERIZED CONJUGATED DIENES
James Warren Graham, Chadds Ford, Pa., assignor to E. I. du Pont de Nemours and Company, Wilmington, Del., a corporation of Delaware
No Drawing. Filed Dec. 19, 1962, Ser. No. 245,646
10 Claims. (Cl. 260—5)

This application is a continuation-in-part of my copending application Ser. No. 210,822, filed July 18, 1962, now abandoned.

This invention relates to novel polymeric compositions which are workable when warmed but become solid at room temperature. More particularly, this invention relates to novel thermoplastic compositions.

For applications such as adhesives, sealants, and caulks there is need for a substance which, when heated, does not liquefy but becomes plastic and workable, but which on cooling remains workable for a reasonable period of time and then sets to a tough solid having good cohesive strength.

When conventional solid polymers are used for adhesives, caulks, or sealants, they are frequently blended with solvents in order to get the polymer into a sufficiently fluid state that it can be readily applied to the surface on which it is to be used. The solvent must then be removed before the polymer can assume its non-tacky condition. Such solvent-polymer compositions take time for preparation and, after application, frequently require a prolonged drying or a heating operation. Most polymers or polymer blends of sufficient fluidity for direct application do not form a cohesive solid at room temperature but require a conventional curing step at a high temperature. Other materials which become fluid when heated set too quickly to a nonworkable solid.

It is an object of this invention to provide novel thermoplastic compositions. Another object is to provide thermoplastic compositions which set within a convenient time upon cooling. A still further object is to provide a thermoplastic composition which upon setting to a solid has good cohesive strength. Other objects will appear hereinafter.

These and other objects of this invention are accomplished with a novel thermoplastic polymer composition composed of two compatible polymers both of which are polymers of a conjugated diene compound. These compositions comprise, by weight (a) 20 to 75 percent of a polymer of a conjugated diolefinic compound, which polymer has a Williams plasticity number (A.S.T.M. Method D–926–56) of at least 1000 at 40° C. and less than 500 at 70° C., and (b) 80 to 25 percent of a polymer of a conjugated diolefinic compound, which polymer has a Brookfield viscosity at 60° C. between 1,000 and 1,500,000 centipoises and which polymer (b) is compatible with polymer (a).

Examples of suitable polymers that may be used as component (a) of the blend of this invention are chloroprene polymers as described hereafter and trans-polyisoprenes such as balata. Either naturally occurring balata or balata from which the resins have been partially or completely removed may be used, although it is preferred to use the more refined materials. Gutta perchia and synthetic trans-polyisoprenes (synthetic balata) may also be used. Synthetic trans-polyisoprenes can be prepared as described in Industrial Engineering Chemistry, Product Research and Development, vol. 1, p. 82 (1962).

The chlorophene polymers that are suitable for use as a polymer component (a) are characterized by a fast rate of crystallization. It is a well-known fact that the rate of crystallization of chloroprene polymers is affected by the temperature at which the monmer is polymerized and that, in general, the polychloroprenes prepared in a lower temperature range, for example, up to about 20° C., crystallize more rapidly than polychloroprenes prepared at higher temperatures. See, for example, the discussion in the following references: Maynard and Mochel, Journal of Polymer Science, vol. 18, pp. 227–34 (1955); Walker and Mochel, Proceedings of the Second Rubber Technology Conference, London, 1948, pp. 69–78. These polymers exhibiting a rapid rate of crystallization also exhibit a rapid change in Williams plasticity numbers as described in the definition. Therefore, chloroprene polymers suitable for use as component (a) may be prepared at temperatures no higher than 20° C. using known techniques. For disclosures of suitable methods see the two references cited above and also the following: U.S. Patents 2,417,034, 2,426,854, 2,567,117. Polymerization may be carried out at below 0° C. using the conventional redox polymerization techniques well-known to those skilled in the art. It is preferred to use homopolymers of chloroprene although when sufficiently low temperatures are used in the polymerization, the polymer may contain up to 20%, by weight based on the total weight of monomer polymerized, of units of another copolymerizable monomer containing ethylenic unsaturation. Examples of suitable copolymerizable monomers include vinyl-substituted aromatic compounds, such as styrene, vinyltoluenes, and vinylnaphthalenes; acrylic and methacrylic acid esters and nitriles, such as methyl methacrylate and acrylonitrile; and conjugated diolefinic compounds such as 1,3-butadiene, isoprene, and 2,3-dichloro-1,3-butadiene.

The polymers to be used as component (b) are also polymers of conjugated diolefinic compounds. They must be compatible with the polymer of component (a), that is, the two polymers should form a homogeneous mixture without showing a tendency to form separate phases. The polymers should have a Brookfield viscosity at 60° C. in the range of about 1,000 to 1,500,000 centipoises, with a preferred viscosity in the range of 5,000 to 600,000 centipoises.

Examples of suitable polymers of component (b) are depolymerized natural rubber or low-molecular-weight polymers of chloroprene or isoprene. Depolymerized rubber, which is a commercially available material, may be prepared by known techniques such as that described in Rubber Age, vol. 66, p. 419 (1950). It should, however, not be used when component (a) is a chloroprene polymer, since the two materials are incompatible.

The low viscosity chloroprene polymers component (b) are those which have been prepared in the presence of a sufficient amount of a modifying or chain-transfer agent that the resulting polymer has a viscosity in the desired range. Examples of suitable modifying agents are aliphatic mercaptans having 4 to 18 carbon atoms and dialkyl xanthogen disulfides in which the alkyl groups have 1 to 8 carbon atoms. The chloroprene polymers of component (b) may be homopolymers or may be copolymers of chloroprene with up to 20%, by weight, based on total monomer weight, of another copolymerizable monomer of the same type as may be used in preparing the chloroprene polymers of component (a).

If the composition of this invention contains less than 20 percent by weight of component (a), the material will have low cohesive strength. If more than 75 percent is included, the blend becomes to viscous to be workable. The preferred content of component (a) in the blend ranges from about 30 to about 50 percent. In some cases where component (b) tends to crystallize at room temperatures, it may be possible to use even less than 20 percent of component (a) in the blend with satisfactory results.

It should be noted that if the diolefinic polymer of component (b) is replaced with conventional plasticizers such as hydrocarbon oils, esters, or chloroparaffins the resulting blend is too soft to be useful. Also, the composition either does not harden at all or hardens at an impractically slow rate. However, if desired, a small amount of these conventional plasticizing agents may be added to the blends of this invention The blends may be prepared by standard techniques. For example, the two polymers may be blended in an internal mixer or dough-type mixer. Mixing is facilitated by heating to temperatures such as 60–70° C.

The blend of components (a) and ((b) may be used without other additives. However, it is preferred to add an antioxidant to improve the aging properties. When one of the components is a chloroprene polymer, it is preferred to add an acid acceptor such as magnesia. Other metal oxides, such as zinc oxide, may be added if desired. Other additives may be used such as fillers and pigments (e.g., clay, carbon black, whiting and titanium dioxide) and auxiliary plasticizers (as mentioned before). For certain uses, particularly in adhesives, resins such as phenol-formaldehyde resins, terpene resins, epoxy resins, and coumarone-indene resins, may be added.

The blends of this invention are soft and workable at temperatures above about 70–80° C. They may be spread with a knife or extruded from a caulking gun, or otherwise applied to substrates using conventional techniques. On cooling they do not solidify at once but have a working life of up to about 15 minutes, during which time they remain tacky and workable. After this time they solidify and gradually set up to a solid having excellent cohesive strength. They can be returned to their soft tacky state by reheating. These characteristics make them highly useful for such applications as hot-melt adhesives, sealants, caulks, etc. Also, if desired, the compositions may be vulcanized by conventional techniques so that they will not return to a soft, tacky state on reheating.

The following examples will better illustrate the nature of the present invention; however, the invention is not intended to be limited to these examples. Parts are by weight unless otherwise indicated.

*Example I*

The polymer used as component (a) is a chloroprene polymer prepared in the following way:

An emulsion is prepared using the following recipe:

| | Parts by weight |
|---|---|
| Chloroprene | 100 |
| Dodecyl mercaptan | 0.25 |
| Disproportionated rosin | 4 |
| Water | 140 |
| Sodium hydroxide | 0.66 |
| Sodium salt of formaldehyde-naphthalenesulfonic acid condensate | 0.5 |
| Sodium sulfite | 0.55 |

Polymerization is carried out in a nitrogen atmosphere at 10° C. The catalyst solution, which is added at such a rate as to give the desired rate and polymerization, is, by weight, 2.80 parts of water and 0.035 part of potassium ferricyanide. Polymerization is carried out to 85–95 percent monomer conversion. Polymerization is then stopped by adding about 2 parts of an emulsion containing phenothiazine and 4-tert-butylcatechol prepared essentially as described in Example 1 of U.S. Patent 2,576,009 except that toluene is used as the hydrocarbon solvent. The latex is additionally stabilized by the addition of an emulsion of the following composition:

| | Parts by weight |
|---|---|
| Water | 1.59 |
| Sodium lauryl sulfate | 0.21 |
| Sodium salt of formaldehyde-naphthalenesulfonic acid condensate | 0.04 |
| Tetraethylthiuram disulfide | 1.50 |
| Toluene | 2.11 |

Any unreacted chloroprene is removed by steam stripings as described in U.S. Patent 2,467,769. The polymer is then acidified with acetic acid and removed by freeze coagulation in the form of a thin film as described in U.S. Patent 2,187,146.

The Williams plasticity number of the polymer at 40° C. is 1170 and at 70° C. is 390.

The polymer used as component (b) is a polychloroprene having Brookfield viscosity at 60° C. of about 500,000 centipoises. The polymer is prepared as follows:

An emulsion is prepared using the following recipe:

| | Parts by weight |
|---|---|
| Chloroprene | 100 |
| Diisopropyl xanthogen disulfide | 4.7 |
| Oleic acid | 3.8 |
| $\alpha,\alpha$-Dimethylbenzyl hydroperoxide (Cumene hydroperoxide) | 0.14 |
| Sodium hydroxide | 0.24 |
| Water | 133.33 |

Emulsification is effected by mixing the chloroprene, the diisopropyl xanthogen disulfide, the oleic acid, and the cumene hydroperoxide, and emulsifying this mixture with the water solution of the sodium hydroxide. Emulsification is effected under nitrogen. The pH of the system is 9. An atmosphere of nitrogen is maintained in the polymerization vessel and mild agitation is maintained throughout the polymerization process.

To the emulsion so prepared is added a solution of the following composition:

| | Parts by weight |
|---|---|
| Ammonium persulfate | 0.20 |
| Sodium 2-anthraquinone-sulfonate | 0.006 |
| Water | 5.0 |

Up to this time no polymerization has taken place. Polymerization is now initiated by adding 0.067 part by weight of solid sodium hydrosulfite dihydrate to the system (0.056 part on an anhydrous basis). Thereafter, polymerization is maintained by the addition, as needed, of a solution containing 0.01 part by weight of sodium hydrosulfite dihydrate, 0.0002 part of sodium hydroxide, and 0.23 part of water. The rate of polymerization is such as to give an increase in specific gravity of about 0.0005 g./cc. per minute.

Polymerization is stopped when the specific gravity of the latex is 1.063 at 20° C. (a monomer conversion of 82%) by addition of 0.015 part of phenothiazine and 0.015 part of 4-tert-butylcatechol dissolved in toluene and emulsified in water containing as emulsifying agents the sodium salt of a formaldehyde-naphthalenesulfonic acid condensate and sodium lauryl sulfate.

The polymer is isolated by drum drying, which is carried out on an 8-inch chromium-plated, double drum drier, using a drum speed of 20 r.p.m. and a steam pressure of 80 p.s.i.g.

Blends of polymer (a) and polymer (b) are prepared by mixing in a dough-type mixer heated to 71° C. A layer of the mixture, about ¼ to ⅛ inch thick, is spread, while warm, in a 1 square inch area between 2 pieces of white pine ¾ x 6 x ⅛ inch in dimensions. The time required for the mixture to set up to a solid is measured. The pieces are then pulled apart in a Scott tensile tester and the shear force required to break the joint is measured. Table I shows the composition of the various blends prepared and the results of the tests. A shear force of 20 p.s.i. is considered adequate for many structural adhesive applications.

TABLE I

| | A | B | C |
|---|---|---|---|
| Composition of blend, parts by weight: | | | |
| Component (a) | 25 | 50 | 75 |
| Component (b) | 75 | 50 | 25 |
| Time to set up, hours | 3 | 4 | 4 |
| Shear force required to break joint, p.s.i. | 72 | 35 | 29 |

Example 2

This example is carried out in the same way as Example 1 except that component (a) is a precipitated balata (trans-polyisoprene) containing no more than 2% resin. The sample used has a Williams plasticity number at 40° C. of 1120 and of 205 at 70° C. Component (b) is the same as used in Example 1. The blend of (a) and (b) has the following composition:

| | Parts by weight |
|---|---|
| Balata | 50 |
| Chloroprene polymer (component (b) of Example 1) | 50 |

The blend sets up in 12 hours. The shear force required to break the joint is 78 p.s.i.

Example 3

This experiment is carried out in the same way as Example 2 except that 50 parts of depolymerized natural rubber (polyisoprene) is used as component (b) instead of 50 parts of the low-molecular-weight chloroprene polymer. The depolymerized rubber has a Brookfield viscosity at 60° C. of about 10,000 centipoises. The blend sets up in 65 minutes. The shear force required to break the bond is 25 p.s.i.

This experiment is repeated using natural rubber smoked sheets in place of the precipitated balata of component (a). The rubber has a Williams plasticity number of 580 at 40° C. and of 80 at 70° C. and therefore does not come under the definition for component (a). After 4 days the polymer composition is still soft and sticky. The shear force required to break the bond is only 3 p.s.i. with cohesive failure of the polymer composition.

Example 4

A blend is prepared having the composition shown in column A of Table I, Example 1. The blend after preparation is transferred to a caulking tube. The caulking tube is heated in boiling water to between 90–100° C., and, while hot, the blend is extruded into a cast-iron soil pipe joint. It is allowed to stand at room temperature to harden. After 3 hours the joint is tested and is found to withstand a hydrostatic pressure of 50 p.s.i. without breaking.

Example 5

A mixture is prepared using the following recipe:

| | Parts by weight |
|---|---|
| Component (a) of Example 1 | 25 |
| Component (b) of Example 1 | 75 |
| Chlorinated paraffin | 20 |
| 2,2'-methylenebis(6-t-butyl-p-cresol) | 2 |
| Epoxy resin (Epon 1001 [1]) | 10 |
| Polyvinylpyrrolidone (K–30 [2]) | 10 |
| Magnesia | 4 |
| Zinc oxide | 10 |

[1] A reaction product of epichlorohydrin with 2,2-bis(4-hydroxyphenyl)propane having a melting point of 65–75° C. and an epoxide equivalent (grams of resin containing one gram-equivalent of epoxide) of 425–550.
[2] Number average molecular weight 40,000, determined by an osmotic method (Journal of Polymer Science, vol. 10, 371 (1953)).

The mixture is thoroughly blended as described in Example 1 and is transferred to a caulking gun. To evaluate the composition as a hot-melt adhesive for adhering gypsum wallboard to studs, an experimental frame is made of 2 x 4 inch pine boards to simulate a section of stud wall. The caulking gun is heated to 90–100° C. in boiling water and a bead of adhesive about ⅜ inch in diameter is extruded down each stud. A 4 x 4 foot panel of gypsum wallboard is pressed against the adhesive, tapping lightly over each stud to spread the adhesive and ensure good seating of the panel. The edge of the panel is resting on the floor. Enough immediate adhesion is obtained to keep the wallboard perpendicular against the frame. After 40 minutes the wallboard is tightly adhered to the frame.

The same adhesive is spread in layers ¼ to ⅛ inch thick and 1 square inch in area to adhere the following materials:

A. Gypsum board (⅜-inch thick) to itself
B. Gypsum board to pine wood (¼-inch thick)
C. Pine wood to itself
D. Pine wood to aluminum (⅛ x 1 x 6 inches in dimension, sand blasted before application of adhesive).

The test pieces are aged at 25° C. for varying times, and separate samples are tested in a Scott tensile tester to determine the shear force required to break the bond.

The following table shows the results. The figures given represent shear force in p.s.i.

| Aging Period | 1 Day | 1 Week | 2 Weeks | 4 Weeks |
|---|---|---|---|---|
| A | 78 | 75 | 75 | 78 |
| B | 66 | 71 | 76 | 75 |
| C | 58 | 59 | 63 | 88 |
| D | 34 | 41 | 47 | 86 |

As many widely different embodiments of this invention may be made without departing from the spirit and scope thereof, it is to be understood that this invention is not limited to the specific embodiments thereof except as defined in the appended claims.

What is claimed is:

1. A thermoplastic composition which is workable at elevated temperatures and solidifies at normal room temperature said composition comprising (a) about 20 to 75 percent by weight of a polymer selected from the group consisting of homopolymers of chloroprene, copolymers of chloroprene with up to 20 percent by weight based on total monomers polymerized of a copolymerizable monomer containing ethylenic unsaturation, and trans-polyisoprene, said polymer having a Williams plasticity number (ASTM Method D–926–56) of at least 1000 at 40° C. and less than 500 at 70° C. and (b) about 80 to 25 percent by weight of a polymer selected from the group consisting of homopolymers of chloroprene, copolymers of chloroprene with up to 20 percent by weight, based on total monomers polymerized, of a copolymerizable monomer containing ethylenic unsaturation, and polyisoprene, said polymer having a Brookfield viscosity at 60° C. between 1,000 and 1,500,000 centipoises and with the proviso that polymer (b) be compatible with polymer (a).

2. A thermoplastic composition as described in claim 1 where polymer (a) is a homopolymer of chloroprene.

3. A thermoplastic composition as described in claim 1 where polymer (b) has a Brookfield viscosity of 5,000 to 600,000 centipoises.

4. A process for the application of a normally solid thermoplastic composition to a surface which process comprises heating a thermoplastic composition as defined in claim 1 and applying said heated thermoplastic composition to said surface.

5. A thermoplastic composition comprising (a) about 20 to 75 percent by weight of a homopolymer of chloroprene having a Williams plasticity number of about 1170 at 40° C. and about 390 at 70° C. and (b) about 80 to 25 percent by weight of a homopolymer of chloroprene having a Brookfield viscosity at 60° C. of about 500,000 centipoises.

6. A process for the application of a normally solid thermoplastic composition to a surface which process comprises heating a thermoplastic composition as defined in claim 5 and applying said heated thermoplastic composition to said surface.

7. A thermoplastic composition comprising (a) about 20 to 75 percent by weight of trans polyisoprene having a Williams plasticity number of about 1120 at 40° C. and about 205 at 70° C. and (b) about 80 to 25 percent by weight of a homopolymer of chloroprene having a Brookfield viscosity at 60° C. of about 500,000 centipoises.

8. A process for the application of a normally solid thermoplastic composition to a surface which process comprises heating a thermoplastic composition as defined in claim 7 and applying said heated thermoplastic composition to said surface.

9. A thermoplastic composition comprising (a) about 20 to 75 percent by weight of trans polyisoprene having a Williams plasticity number of about 1120 at 40° C. and about 205 at 70° C. and (b) about 80 to 25 percent by weight of polyisoprene having a Brookfield viscosity at 60° C. of about 10,000 centipoises.

10. A process for the application of a normally solid thermoplastic composition to a surface which process comprises heating a thermoplastic composition as defined in claim 9 and applying said heated thermoplastic composition to said surface.

References Cited

UNITED STATES PATENTS

| | | | |
|---|---|---|---|
| 2,657,190 | 10/1953 | Banes et al. | 260—890 |
| 2,920,057 | 1/1960 | Pritchard | 260—894 |
| 3,025,261 | 3/1962 | Sterling | 260—890 |
| 3,079,365 | 2/1963 | Andersen et al. | 260—890 |
| 3,147,318 | 9/1964 | Jungk | 260—890 |

MURRAY TILLMAN, *Primary Examiner.*

G. F. LESMES, *Assistant Examiner.*